(12) United States Patent  (10) Patent No.: US 7,867,015 B1
Parker                     (45) Date of Patent:     Jan. 11, 2011

(54) STRAIN RELIEF DEVICE FOR PROTECTION OF POWER CORDS

(75) Inventor: John Parker, Dunedin, FL (US)

(73) Assignee: Parker Research Corporation, Clearwater, FL (US)

( * ) Notice: Subject to any disclaimer, the term of this patent is extended or adjusted under 35 U.S.C. 154(b) by 0 days.

(21) Appl. No.: 12/694,812

(22) Filed: Jan. 27, 2010

(51) Int. Cl.
H01R 13/58 (2006.01)

(52) U.S. Cl. ............... 439/465; 439/455; 439/470

(58) Field of Classification Search .......... 439/455, 439/457, 465, 470
See application file for complete search history.

(56) References Cited

U.S. PATENT DOCUMENTS

| 3,861,778 | A | * | 1/1975 | Capra | 439/461 |
| 4,108,527 | A | * | 8/1978 | Douty et al. | 439/465 |
| 4,963,104 | A | * | 10/1990 | Dickie | 439/460 |
| 5,503,568 | A | * | 4/1996 | Pryce | 439/427 |
| 6,007,384 | A | * | 12/1999 | Kraemer et al. | 439/607.44 |
| 6,106,325 | A | * | 8/2000 | Kuo | 439/455 |
| 6,179,646 | B1 | * | 1/2001 | Horchler | 439/460 |

* cited by examiner

*Primary Examiner*—James Harvey
(74) *Attorney, Agent, or Firm*—Ronald E. Smith; Smith & Hopen, P.A.

(57) ABSTRACT

A strain relief device for protecting a power cord includes a tubular base member defining a lumen adapted to accommodate a power cord. The lumen includes a trailing lumen, a leading lumen, and an annular recess formed between the trailing and leading lumens. The leading lumen has flat, tapered sidewalls. A tapered cylindrical plug is sized to snugly fit within the leading lumen and has a protruding annular rim at its narrow end. The diameter of the protruding annular rim is about equal to the diameter of the annular recess so that the rim snaps into the recess when the plug is inserted into the leading lumen. The plug is disposed in encircling relation to the power cord prior to insertion of the plug. Pulling on the power cord increases the compression of the plug about the cord due to the common taper of the plug and the leading lumen.

5 Claims, 3 Drawing Sheets

STRAIN RELIEF DEVICE FOR PROTECTION OF POWER CORDS

BACKGROUND OF THE INVENTION

1. Field of the Invention

This invention relates, generally, to strain relief devices. More particularly, it relates to a strain relief device for power cords.

2. Description of the Prior Art

Many users of electrical equipment pull on the cord instead of the plug when they are in a hurry to unplug the device. Most plugs include strain relief protection and the plug will withdraw from the socket before the electrical conductors that are sheathed within the power cord will separate from their protective terminals.

However, the power cord for most tools and appliances is permanently connected to the tool or appliance at the end of the power cord opposite from the plug. Many tools and appliances have nominal strain relief protection at that end of the power cord. However, in many work places, including manufacturing or assembly facilities, workers routinely pull on such cords at the tool or appliance end in order to move the tool or appliance nearer to themselves. Over time, the strain relief protection degrades and the electrical conductors sheathed within the power cord are pulled from their respective electrical terminals.

One well-known strain relief device is an elongate coiled spring, typically formed of a relatively hard plastic. A plastic cap is attached by a living hinge to a preselected end of the coiled spring. A rigid thin plastic plate is integrally formed with the cap. The power cord is passed through the lumen of the coiled spring, and the cap is closed. This causes the thin plate to tightly pinch the cord, thereby providing at least some strain relief protection when a user pulls on the cord.

However, a strong pull on the cord will overcome the pinching action of the rigid thin plate because the plate is thin. This concentrates the pinching action without spreading it out over a large area. The strain relief may fail in two ways. First, the pinching action may slip, allowing the rubberized power cord and the electrical conductors sheathed therewithin to withdraw from the tool or appliance. In a second type of failure, the pinching action maintains the rubberized sheath of the power cord in place while the pulling action results in travel of the electrical conductors relative to said stationary sheath. The conductors thus separate from their respective electrical terminals, thereby defeating the protective device even though the rubberized sheath of the power cord has not moved.

Some conventional strain relief devices actually grip the cord, but do so by tightening the cord from within. However, such tightening does not prevent the cord from being pulled out.

Conventional strain relief devices also have abrupt, sharp ends that allow the cord to bend ninety degrees)(90°, leading to eventual breaking.

Several different types of conventional strain relief devices may be seen at heyco.com.

There is a need, therefore, for a strain relief protective device that does not rely upon a concentrated pinching action to provide strain relief.

There is also a need for an improved strain relief device that does not reply upon tightening the cord from within.

A need further exists for a strain relief device that increases its strength as the cord is pulled harder.

There is also a need for a strain relief device that protects a power cord at the point of exit of the power cord from the strain relief device.

However, in view of the prior art considered as a whole at the time the present invention was made, it was not obvious to those of ordinary skill in this field how an improved strain relief protective device could be provided.

SUMMARY OF THE INVENTION

The long-standing but heretofore unfulfilled need for an improved strain relief device for protecting power cords is now met by a new, useful, and non-obvious invention.

The inventive structure includes a truncate tubular base member defining a lumen adapted to accommodate an elongate power cord. The lumen includes a trailing lumen, a leading lumen, and an annular recess formed therein between the trailing and leading lumens.

The leading lumen has flat, tapered sidewalls that converge toward one another in a leading-to-trailing direction so that a diameter of the leading lumen at a leading end is greater than a diameter of a trailing end of the leading lumen.

A tapered cylindrical plug is sized to fit snugly within the tapered leading lumen. The plug has a first end greater in diameter than a second end and has a protruding rim formed in its second end. The diameter of the protruding rim is substantially equal to the diameter of the annular recess. The plug and the base member are formed of elastomeric materials having sufficient flexibility to enable the plug to be inserted into the leading lumen until the rim snaps affirmatively into the annular recess.

The lumen of the plug has a diameter slightly less than a diameter of the power cord with which the plug is adapted to be used. The plug is adapted to be disposed in encircling relation to the power cord prior to insertion of the plug into the leading lumen.

A plurality of protruding annular ridges is formed in the lumen of the plug, each annular ridge of said plurality of annular ridges being normal to a longitudinal axis of the plug. The plurality of annular ridges collectively provides multiple equidistantly and longitudinally spaced pinch regions adapted to circumscribe the power cord.

The trailing lumen of the base member has arcuate sidewalls that diverge from one another in a leading-to-trailing direction so that the trailing lumen provides ample clearance for said power cord, said arcuate walls protecting the power cord when it is bent to one direction or another outside of the base member.

The primary object of the invention is to provide a strain relief device that is much more reliable than the strain relief devices of the prior art.

A more specific object is to provide a strain relief device that increases the amount of strain relief provided as the strain on a power cord is increased.

Another important object is to provide a strain relief device having a trailing end that protects a power cord that is bent sharply at its exit from the strain relief device.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
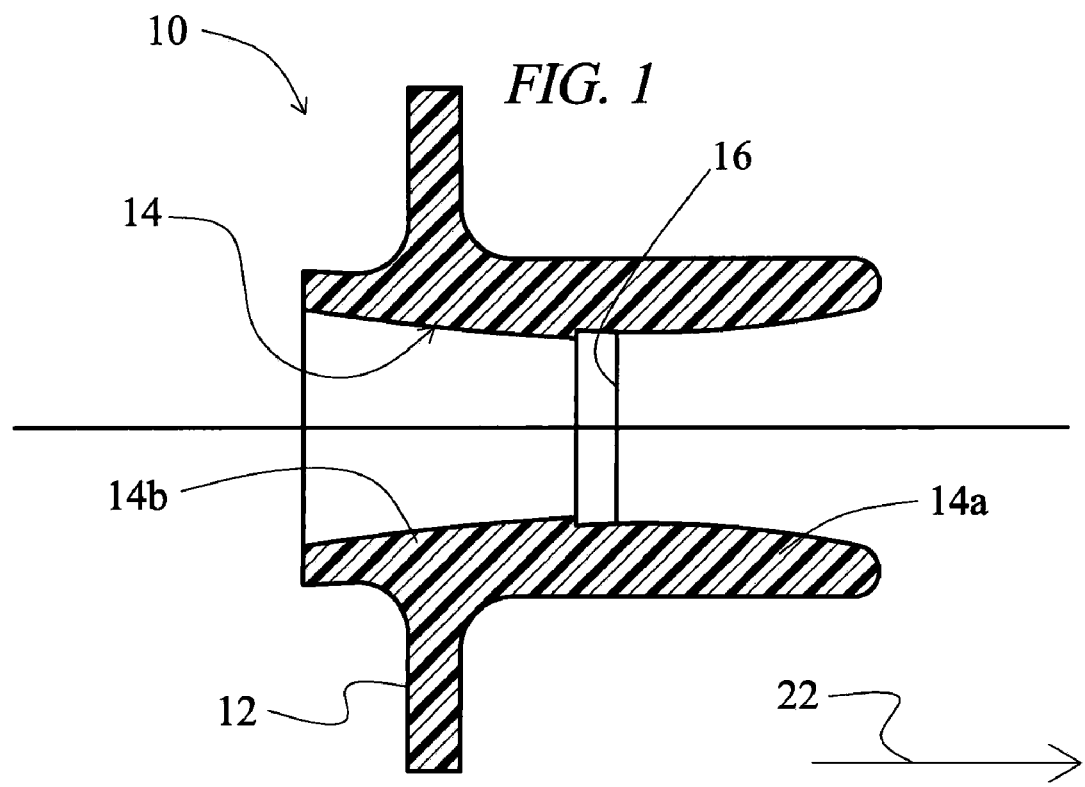
FIG. 1 is a transverse sectional view of the base member of the novel strain relief device.

Referring now to FIG. 1, it will there be seen that the novel base member is denoted as a whole by the reference numeral 10.

Flange 12 is depicted as being integrally formed with base member 10 but it should be understood that said flange could be provided as an independent member and said flange is not a part of the invention, per se. It provides a means for connecting base member 10 to a tool, appliance, or other item having an electrical power cord that is intended to be a permanent part of said tool, appliance or other electrically powered item. There are many different flanges of differing shapes and sizes, not all of which are flat, that may be required for differing tools or appliances. Moreover, many connection applications include no flanges and instead employ threaded connections for securing the novel strain relief device to the tool or appliance. Instead of a flanged or a screw-threaded connection, the novel device may be secured to a tool or appliance chassis by a quick release mechanism, a snap-fit or pinching connector, a press fit, many types of clamps, and so on. It can be designed to accommodate many different chassis openings and sizes as well. Any means for connecting base member 10 to a tool or appliance is within the scope of this invention, not just the depicted flange means.

Base member 10 is a truncate, tubular member defining a lumen 14 through which a conventional power cord extends. Lumen 14 includes a trailing lumen 14a and a leading lumen 14b.

Trailing lumen 14b has arcuate sidewalls that diverge from one another so that said trailing lumen provides ample clearance for a power cord, not shown. In other words, the diameter of the trailing end of trailing lumen 14b is greater than its diameter at its leading end.

The arcuate walls protect the power cord when it is bent to one direction or another outside of lumen 14a.

The sidewalls of leading lumen 14b are flat and tapered and converge toward one another in a leading-to-trailing direction, i.e., the diameter of the leading end of leading lumen 14b is greater than its diameter at its trailing end.

Annular recess 16 is formed mid-length of lumen 14. Accordingly, it is contiguous to the leading end of trailing lumen 14a and the trailing end of leading lumen 14b. It forms an annular shoulder with the trailing end of leading lumen 14b.

Figure 2:
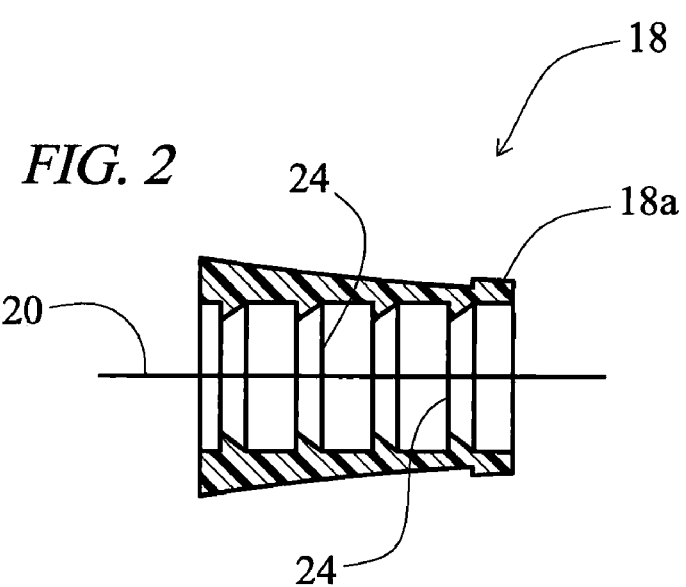
FIG. 2 is a transverse sectional view of the plug member of the novel device.
Figure 3:
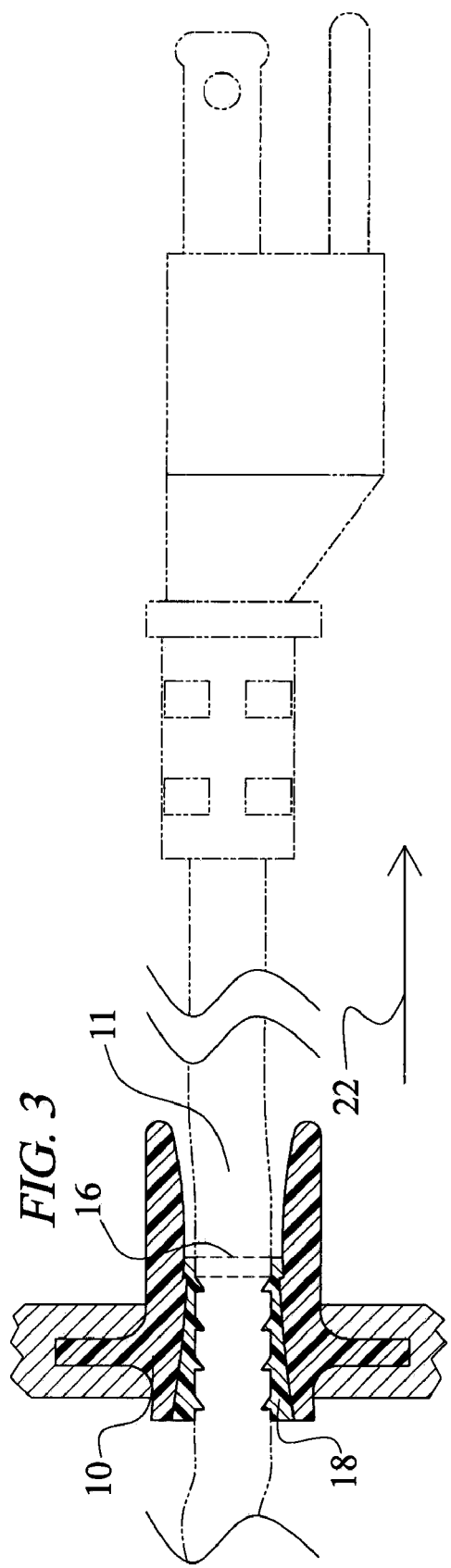
FIG. 3 is a sectional view depicting the novel structure when in assembled relation to a power cord.

FIG. 2 depicts plug 18 in transverse section. Plug 18 is a tapered cylinder having protruding rim 18a formed in its narrow end. The diameter of narrow rim 18a is substantially equal to the diameter of annular recess 16. Plug 18 is sized so that it fits snugly within tapered lumen 14b of base member 10. Plug 18 and base member 10 are formed of elastomeric materials having sufficient flexibility to enable plug 18 to be inserted into lumen 14b until rim 18a snaps affirmatively into annular recess 16. When rim 18a snaps into annular recess 16, the wide end of plug 18 is substantially flush with the wide, leading end of lumen 14b.

The taper of plug 18 is substantially the same as the taper of leading lumen 14b.

Plug 18 is installed in encircling relation to a power cord prior to insertion of plug 18 into leading lumen 14b. The lumen of plug 18 has a diameter slightly less than the diameter of the power cord with which it will be used. Most conventional power cords are manufactured in three (3) different diameters so base member 10 and plug 18 will also be manufactured in three (3) different diameters to accommodate said size differences.

There are two (2) ways of facilitating the introduction of a power cord into the lumen of plug 18. First, plug 18 may be cut longitudinally into two parts of equal size as indicated by parting line 20 in FIG. 2. The two parts are then placed into encircling relation to a power cord, sandwiching the power cord between them. This causes the power cord to be compressed along the extent of plug 18 when rim 18a snaps into annular recess 16. The second way is the same as the first except that the cut produces a living hinge so that the two (2) halves of plug 18 are not entirely separated from one another but can still be opened widely to allow insertion of a power cord therebetween.

Pulling on the power cord in the direction indicated by single-headed directional arrow 22 in FIG. 1 causes plug 18 to increase its compression against the power cord due to the respective common tapers of leading lumen 14b and plug 18. The amount of compression increases as the magnitude of the pulling force increases. The common length of leading lumen 14b and plug 18 is substantially greater than the length of the prior art thin plate, thus providing greatly enhanced strain relief protection.

The strain relief protection is further enhanced by a plurality of protruding annular ridges, collectively denoted 24 in FIG. 2, said ridges being formed in the lumen of plug 18. Each of these annular ridges is normal to the longitudinal axis of plug 18 and collectively said ridges provide multiple equidistantly and longitudinally spaced pinch regions that circumscribe the power cord, unlike the prior art single pinch point that does not circumscribe the power cord.

Figure 4:
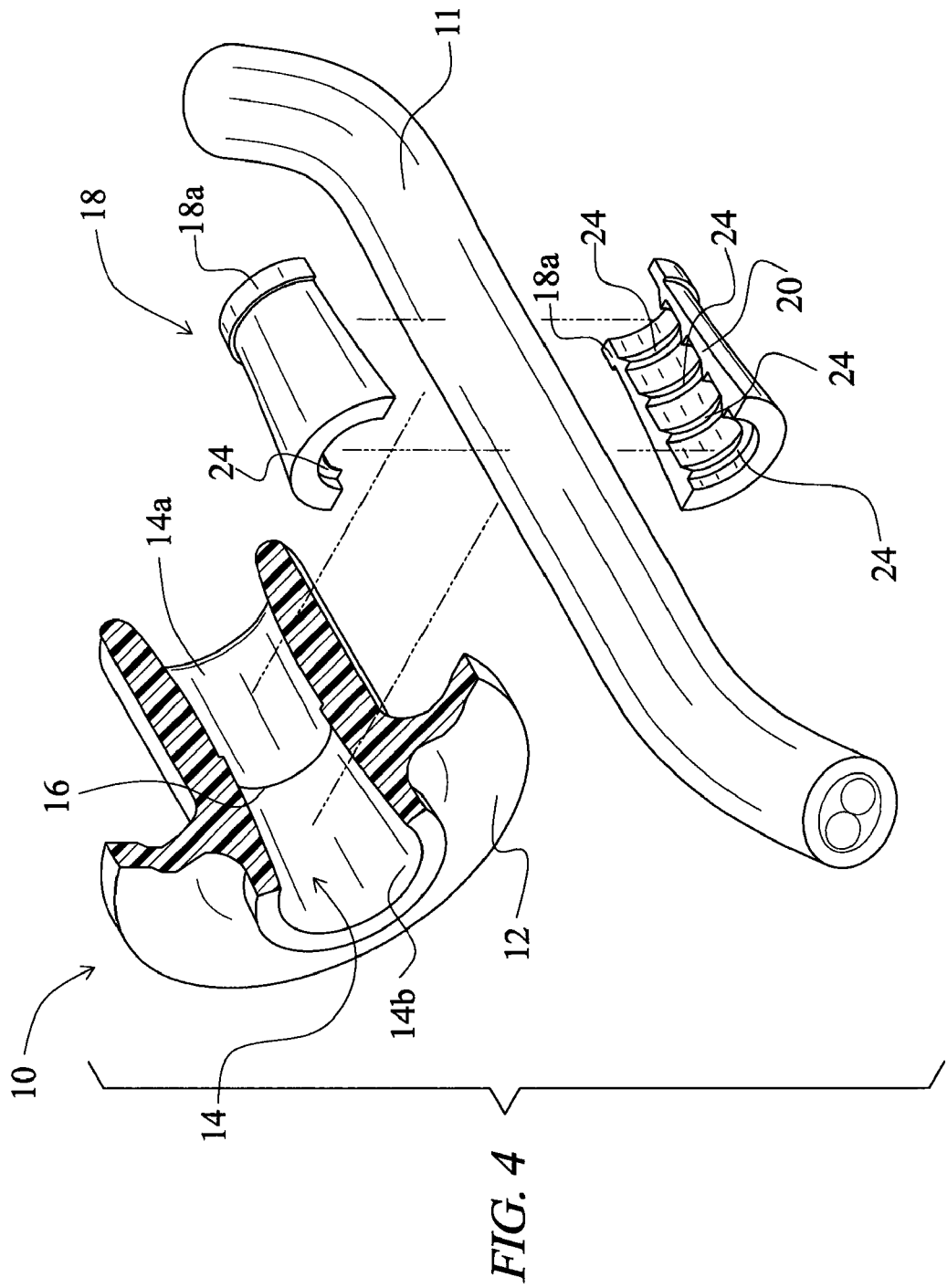
FIG. 4 is an exploded and partially cut-away view of the novel structure.

The above-disclosed parts are also depicted in FIG. 4.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein disclosed, and all statements of the scope of the invention that, as a matter of language, might be said to fall therebetween.

What is claimed is:

1. A strain relief device for protecting a power cord, comprising:

a truncate tubular base member defining a lumen adapted to accommodate an elongate power cord;

said lumen including a trailing lumen, a leading lumen, and an annular recess formed therein between said trailing and leading lumens;

said leading lumen having flat, tapered sidewalls that converge toward one another in a leading-to-trailing direction so that a diameter of the leading lumen at a leading end is greater than a diameter of a trailing end of said leading lumen;

a tapered cylindrical plug having a first end greater in diameter than a second end and having a protruding rim formed in said second end;

said diameter of said protruding rim being substantially equal to the diameter of said annular recess;

said plug and said base member being formed of elastomeric materials having sufficient flexibility to enable said plug to be inserted into the leading lumen of said base member until said rim snaps affirmatively into said annular recess;

said plug being sized to fit snugly within said tapered leading lumen.

2. The device of claim 1, further comprising:

a lumen of said plug having a diameter slightly less than a diameter of the power cord with which said plug is adapted to be used;

said plug adapted to be disposed in encircling relation to said power cord prior to insertion of said plug into said leading lumen.

3. The device of claim 2, further comprising:

a plurality of protruding annular ridges formed in the lumen of said plug;

each annular ridge of said plurality of annular ridges being normal to a longitudinal axis of said plug;

said plurality of annular ridges collectively providing multiple equidistantly and longitudinally spaced pinch regions adapted to circumscribe said power cord.

4. The device of claim 1, further comprising:

said trailing lumen having arcuate sidewalls that diverge from one another in a leading-to-trailing direction so that the trailing lumen provides ample clearance for said power cord, said arcuate walls protecting the power cord when it is bent to one direction or another outside of said base member.

5. The device of claim 2, further comprising:

said plug being made of two separate halves to facilitate placing of said plug into encircling relation to said power cord.

* * * * *